United States Patent
Money et al.

(10) Patent No.: US 7,062,253 B2
(45) Date of Patent: Jun. 13, 2006

(54) METHOD AND SYSTEM FOR REAL-TIME TIERED RATING OF COMMUNICATION SERVICES

(75) Inventors: Jesse Money, Shawnee, KS (US); Von McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 295 days.

(21) Appl. No.: 10/119,508

(22) Filed: Apr. 10, 2002

(65) Prior Publication Data

US 2004/0009761 A1  Jan. 15, 2004

(51) Int. Cl.
*H04M 11/00* (2006.01)

(52) U.S. Cl. ...................... 455/406; 709/223
(58) Field of Classification Search ............ 709/223; 455/406

See application file for complete search history.

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,119,017 A | 9/2000 | Cassidy et al. | |
| 6,178,323 B1 | 1/2001 | Nagata | |
| 6,381,467 B1 | 4/2002 | Hill et al. | |
| 6,490,452 B1 | 12/2002 | Boscovic et al. | |
| 6,526,377 B1 | 2/2003 | Bubb | |
| 6,625,645 B1 | 9/2003 | Van Horne et al. | 709/221 |
| 2002/0055364 A1 | 5/2002 | Wang et al. | |
| 2002/0071445 A1 | 6/2002 | Wu et al. | |
| 2002/0107000 A1 | 8/2002 | Goss et al. | 455/405 |
| 2002/0120729 A1* | 8/2002 | Faccin et al. | 709/223 |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |

(Continued)

FOREIGN PATENT DOCUMENTS

EP  0 817 457  1/1998

(Continued)

OTHER PUBLICATIONS

Internet Engineering Task Force Request For Comment 2002, "IP Mobility Support," C. Perkins, Oct. 1996.

(Continued)

*Primary Examiner*—William D. Cumming (57) ABSTRACT

A service agent can receive a request to establish a communication session between a communicative entity and another communicative entity. The service agent can access profile information for the communicative entity. Using the profile information the service agent can detect a transition from a first billing mode to a second billing mode, and it can prompt the communicative entity for an authorization to transfer from the first billing mode to the second billing mode.

27 Claims, 5 Drawing Sheets

U.S. PATENT DOCUMENTS

2003/0021264 A1   1/2003   Zhakov et al.
2003/0114156 A1   6/2003   Kinnavy

FOREIGN PATENT DOCUMENTS

EP            0 984 608        3/2000

OTHER PUBLICATIONS

Internet Engineering Task Force Request For Comments 2003, "IP Encapsulation within IP," C. Perkins, Oct. 1996.
Internet Engineering Task Force Request For Comments 2004, "Minimal Encapsulation within IP," C. Perkins, Oct. 1996.
Internet Engineering Task Force Request For Comments 2005, "Applicability Statement for IP Mobility Support," J. Solomon, Oct. 1996.
Internet Engineering Task Force Request For Comment 2327, "SDP: Session Description Protocol," Handley et al., Apr. 1998.
Internet Engineering Task Force Request for Comment 2543, "SIP: Session Initiation Protocol," Handley et al., Mar. 1999.
Internet Engineering Task Force Request For Comment 2616, "Hypertext Transfer Protocol—HTTP/1.1", Fielding et al., Jun. 1999.
Internet Engineering Task Force Request For Comment 2865, "Remote Authentication Dial In User Service (RADIUS)," Rigney et al., Jun. 2000.
Internet Engineering Task Force Request For Comment 2866, "RADIUS Accounting," C. Rigney, Jun. 2000.
International Search Report for PCT/US03/07130 mailed Mar. 23, 2004.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
U.S. Appl. No. 10/277,465, filed Oct. 22, 2002 entitled "Method for Call Setup Using Short Data Bursts" (Sprint Docket 1999).
3$^{rd}$ Generation Parntership Project 2 "3GPP2", Fast Call Set-Up, Version 1.0, Apr. 15, 2002.
Mobile Tornado, www.mobiletornado.com/products_iprsptt.html, printed from the World Wide Web on Jan. 27, 2003.

"Qualcomm Chats Up 'Push-to-Talk'," Siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Ericsson, telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum Systesm, IS-2000-3, Jul. 12, 1999.
3$^{rd}$ Generation Partnership Project 2 '3GPP2', "Interoperability Specification (IOS) for CDMA 2000 Access Network Interfaces—Part 3 Features," Nov. 2001.
OMA, Discussion and definitions on PoC Floor Control, Input Contribution, Doc #OMA-REQ-2003-0375-PoC_Floor_Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-REQ-2003-0367-PoC_Input_Motorola, May 29, 2003.
OMA, "Push to Talk over Cellular (PoC)," Version: 0.1.6, May 12, 2003.
International Search Report from International Application No. PCT/US2003/02950, dated Jan. 30, 2003.
Office Action from U.S. Appl. No. 10/067,080, dated May 21, 2003.
Office Action from U.S. Appl. No. 10/067,080, dated Apr. 27, 2004.

* cited by examiner

METHOD AND SYSTEM FOR REAL-TIME TIERED RATING OF COMMUNICATION SERVICES

FIELD OF THE INVENTION

The prevent invention relates to communication systems. More specifically, it relates to a method for real-time tiered rating of communication services.

BACKGROUND OF THE INVENTION

Cellular wireless networks are becoming an increasingly popular form of communication. A user can connect to a cellular wireless network using a wireless device, such as a cellular phone. Once connected to the cellular wireless network, a user can communicate with another device also connected to the cellular wireless network. Additionally, the cellular wireless network can connect to the public switched telephone network, to the Internet or to another network, and a wireless device on the cellular wireless network can communicate with another device on one of the other networks.

A cellular wireless network can allow a user to perform a variety of different services while connected to the cellular wireless network. For example, a user may be able to engage in a voice conversation, participate in an instant messaging session, browse websites, exchange files with other devices, download content to the wireless device or engage in many other now-known or later-created services.

Users of the cellular wireless network are generally billed for their access to the cellular wireless network. A user is commonly charged a flat rate for a set number of minutes of airtime on the cellular wireless network. The user may be billed additional charges for long-distance calls, "roaming" outside their home area, exceeding their monthly allotment of minutes or for other such charges. The user ordinarily subscribes to service by signing a service contact. The user is then billed in accordance with the terms of the service contract. The user may vary the terms of service by signing a new service contract or modifying the user's existing contract.

Although different users are ordinarily billed based on the amount of airtime they use, they may have different usage patterns that place different strains on the cellular wireless network. For example, one user may engage in a large number of instant messaging sessions, while another user may send a large number of files over the cellular wireless network. In another example, one user may consume a large amount of airtime in voice conversations, while another user may consume a large amount of airtime browsing websites. For roughly the same amount of airtime, these different services may each place a different strain on the cellular wireless network. As one example, sending a large number of files may be more noticeably taxing on the cellular wireless network than engaging in an instant messaging session; however, these differences in strain on the cellular wireless network are not reflected in a billing system based primarily on airtime consumed.

Therefore, there exists a need for a new and improved system and method for providing real-time tiered rating of communication services.

SUMMARY OF THE INVENTION

A service agent can reside on a wireless communications network. The service agent can receive a communication request to establish a session between a communicative entity and another communicative entity. The request may be sent from the communicative entity through the service agent to the other communicative entity, or it may be sent from the other communicative entity through the service agent to the communicative entity.

When the service agent receives the request, the service agent may obtain profile information for the communicative entity, and it may obtain profile information for a communicative entity subscriber. The profile information may define a communication unit, and it may define at least two billing modes. The communicative entity's consumption of wireless communications network resources can be measured in communication units. The service agent may detect a billing mode change from a first billing mode to a second billing mode when the mobile station's consumption of wireless telecommunication network resources exceeds a predetermined amount.

The service agent can then notify the communicative entity of the detected billing mode change. The service agent may request an approval from the communicative entity to transfer from the first billing mode to the second billing mode. If the service agent receives an approval from the communicative entity, the service agent may allow the session to be established, for example by forwarding the request to its intended destination. However, if the service agent does not receive an approval from the communicative entity, the service agent may prevent the communication session from being established, or it may elect to invoke default conditions for limited usage. For example, the service agent may prevent the request from being delivered to its intended destination.

The service agent may also detect a billing mode transfer during an established communication session, and it may temporarily suspend the communication. Then, the service agent may notify the communicative entity of the detected billing mode change, and it may receive an approval from the communicative entity to transfer billing modes. If the service agent receives the approval, then the service agent may allow the communication to proceed; however, if the service agent does not receive an approval, then the service agent may terminate the communication session.

These as well as other aspects and advantages of the present invention will become apparent from following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF PREFERRED EMBODIMENTS

A service agent can reside on a cellular wireless network ("cellular network"). The service agent can be used to regulate communication between a mobile station on the cellular network and another device. For example, the service agent may be used to process a request to establish a session between the mobile station and another device. The service agent may receive the request to establish the session between the mobile station and the other device, and it may access profile information, including billing information, about the mobile station. Then, based on the type of proposed session between the two devices and based on the profile information about the mobile station, the service agent may determine that the mobile station should be billed at a different rate than is currently authorized for the requested service. The service agent may then request an authorization from the mobile station to approve the billing rate change. If the mobile station approves the billing rate change, then the service agent may allow the communication session; however, if the mobile station does not approve the billing rate change, then the service agent may prevent the communication session.

1. Exemplary Architecture

Figure 1:
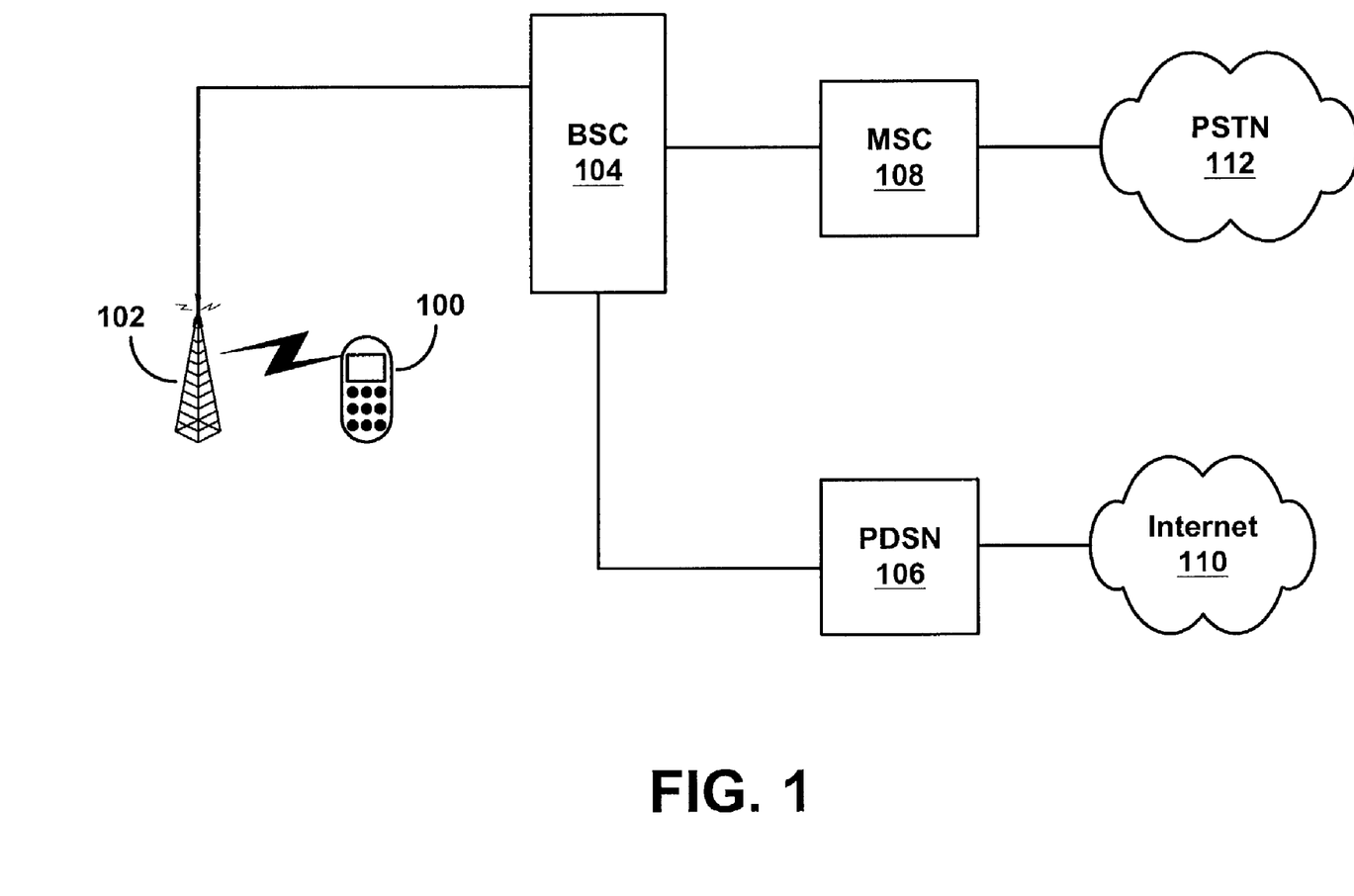
FIG. 1 is an exemplary architecture for a cellular wireless network that can be used to practice the exemplary embodiment.

FIG. 1 shows an exemplary architecture for a cellular network that can be used to practice the exemplary embodiment. In a preferred embodiment, a mobile station 100 wirelessly connects with the cellular network, and the mobile station 100 can then communicate with another device on the cellular network. In turn, the cellular network may provide connectivity to the public switched telephone network ("PSTN"). The cellular network may also provide connectivity to a packet data switched node ("PDSN"), which in turn can provide connectivity to a packet-switched network, such as the Internet 110. Through this connectivity, a mobile station 100 may communicate with a device on one of these networks.

The mobile station 100 may be a cellular phone, a mobile phone, a personal digital assistant ("PDA"), an Internet equipped computer, or another wireless device. In an alternative embodiment the mobile station 100 can be a wired device, such as a computer or an Internet appliance, connected to the cellular network. While FIG. 1 depicts one mobile station 100 connected to the cellular network, the cellular network may include more than one mobile station 100.

In a preferred embodiment, the mobile station 100 is linked by an air interface to a base transceiver station antenna ("base station") 102. The mobile station 100 can communicate with the base station 102 using a variety of different protocols. In a preferred embodiment, the mobile station 100 communicates with the base station 102 using Code Division Multiple Access ("CDMA"). CDMA provides a method for sending wireless signals between the mobile station 100 and the base station 102. In a CDMA system, the base station 102 communicates with the mobile station 100 over a spread spectrum of frequencies. Components for a CDMA system can include those described in the Telecommunications Industry Association ("TIA") standard, ANSI/TIA/EIA-95-B-99, dated Feb. 3, 1999, which is incorporated herein by reference in its entirety.

Time Division Multiple Access ("TDMA") is another popular method for wireless communications that may be used for communication between the mobile station 100 and the base station. In TDMA systems, the base station 102 typically communicates on a group of frequencies, and each frequency may itself carry at least one multiplexed call. The mobile station 100 and the base station 102 may also communicate using the Global System for Mobile Communications ("GSM") or another method.

The base station 102 couples to a base station controller ("BSC") 104. The BSC 104 connects to a mobile switching center ("MSC") 108, and the MSC 108 connects to the PSTN 112. The mobile station 100 may then communicate with another device connected to the PSTN 112 or with another device on the cellular network.

In addition to connecting to the MSC 108, the BSC 104 may also connect with a PDSN 106. The PDSN 106 can provide connectivity to a packet-switched network, such as the Internet 110, an intranet or another network. Once the mobile station 100 connects, for example, to the Internet 110 through the cellular network, it can exchange data with other devices also connected to the Internet 110. This may be done using an appropriately supported protocol suite, such as the Transmission Control Protocol ("TCP") and the Internet Protocol ("IP").

TCP/IP is one protocol suite that may be used for transmitting data over a packet switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

Each device may be assigned an IP address, which is 32-bits long. The IP address assigned to a device is usually globally unique, and this allows data to be accurately sent between devices on different networks. Data to be transmitted between devices is placed into an IP packet. The header of the IP packet includes the source and destination IP addresses of the two communicating devices. The packet is sent over the network, and, using the destination device's IP address included in the header, appropriately routed to the destination device. The packet may travel through different devices and across different networks before ultimately reaching its destination, and the IP address helps to ensure accurate routing through these devices.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order.

TCP/IP is one method for sending data between two devices, and other Internet or network protocols may also be used. For example, the User Datagram Protocol ("UDP") may be used in conjunction with IP to exchange data between devices. In another example, a device may use Mobile IP, which is an extension of IP. An IP address is usually associated with one particular network; however, a wireless device with an assigned IP address may roam through more than one network during a call. Mobile IP is an extension of the IP protocol that allows a device to move across different networks while using an IP address that may only be associated with one particular network.

Mobile IP is described in more detail in the Internet Engineering Task Force Request For Comment 2002, "IP Mobility Support," C. Perkins, October 1996, which is incorporated herein by reference in its entirety. Internet Engineering Task Force Request For Comments 2003–2005, which are each incorporated herein by reference in their entirety, also describe Mobile IP in more detail.

Figure 2:
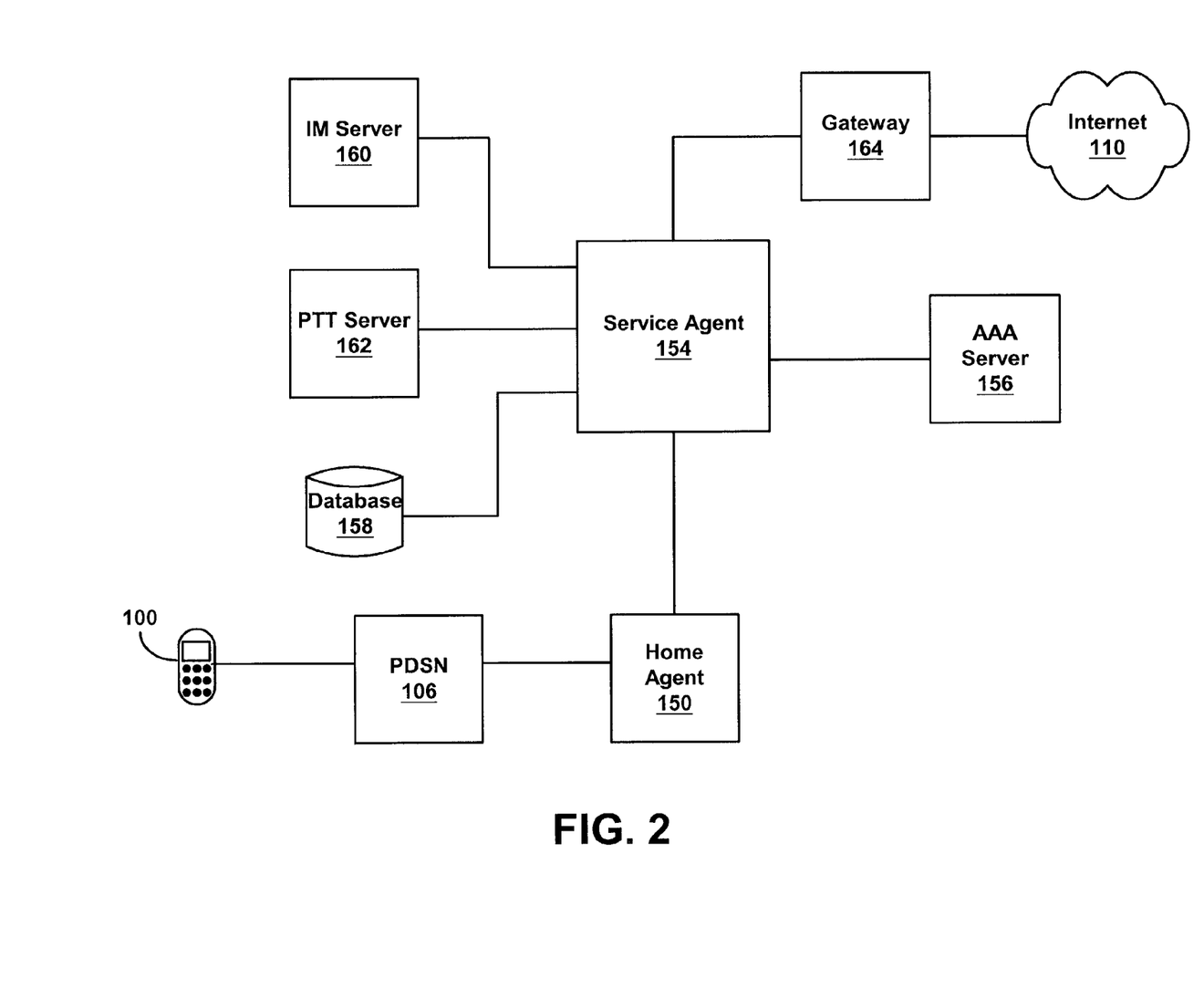
FIG. 2 is an exemplary architecture for a communications network using a service agent.

FIG. 2 shows an exemplary architecture for a communications network using a service agent 154. The mobile station 100 connects to the PDSN 106. This can be done through a variety of different methods. For example, the mobile station 100 may connect to the PDSN 106 through the cellular network described in FIG. 1. The PDSN 106 then connects with a home agent 150. The home agent 150 generally tracks the location of the mobile station 100, for example by storing a care-of address for the mobile station 100 when the mobile station 100 roams to another network. The home agent 150 can also forward data addressed to the mobile station's home address to the mobile station's current location by using the mobile station's care-of address. The home agent 150 then connects to the service agent 154.

The service agent 154, which will be described in further detail later, can regulate communications between the mobile station 100 and another device, such as one connected to the Internet 110 or to the cellular network. The service agent 154 can serve as an intermediary for communications between the two devices. In one embodiment, the service agent 154 may connect to a message bus. Using the message bus the service agent 154 may monitor communications between the mobile station 100 and the other device. For example, the service agent 154 may count messages traveling between the devices. The service agent 154 may also detect certain types of messages, such as requests to establish a session between the mobile station 100 and the other device.

In another embodiment, communications between the mobile station 100 and the other device may be routed through the service agent 154. The service agent 154 may count communications between the devices. The service agent 154 may also detect different types of messages, such as connection requests.

After detecting messages, such as requests to establish a session, the service agent 154 may access profile information for the mobile station 100. Based on the profile information and the type of session requested, the service agent 154 may allow or deny the session. The service agent 154 may include or connect to a database 158, which can store profile information about the mobile station 100. The database 158 can include a variety of different information, such as: mobile station profiles, mobile station user profiles, mobile station billing records, mobile station accounting information or other information. When the service agent 154 receives or detects a request, such as a connection request or other type of request, it can access the database 158 to determine profile information about the mobile station 100 making or receiving the request. Then, the service agent 154 can use the information obtained from the database 158 in processing the request. This can allow the service agent 154 to process requests in a manner specific to the requesting mobile station 100. As an alternative to storing data in a database 158 that can be directly accessed by the service agent 154, the data may be stored on a server, which the service agent 154 can access to retrieve the requested data.

The database 158, for example, may store profile information and be hosted on a profile server. The profile server may include information about a mobile station user or a community of mobile station users. It may store names and addresses, mobile station user types, which services and applications the mobile station 100 can access, accounting information, billing information or other information. The profile server may also hold location-sensitive preferences, such as notification procedures for multiple mobile stations.

In addition, the profile server can provide storage and retrieval for defined groups. The groups may be groups of mobile stations, mobile station subscribers, SIP users or other combinations. The groups can be defined by mobile station subscribers, or they can be defined by a network administrator or other central authority. The groups can be used across a number of services, such as Push To Talk ("PTT") (i.e., two-way radio communications), Instant Messaging ("IM") or other applications. Groups may be defined with Network Access Identifiers ("NAIs"), Mobile Identifier Numbers ("MINs"), Electronic Serial Numbers ("ESNs"), aliases of members or other identifiers. The groups may also be defined using a combination of identifiers.

The database 158 may also store presence information, and it may be hosted on a presence server. The presence server may manage presence information, including receipt of subscriptions, notifications of users' availability changes and requests for authorization of subscriptions. The presence server can offer stand-alone presence services, such as buddy lists or text chats, or it can offer presence services integrated with other applications.

The database 158 may also store name resolution information, and it may be hosted on a name resolution server ("NRS"). The NRS may include a list of identifiers for different mobile stations 100. The identifiers may be MINs, ESNs or other identifiers. The service agent 154 can use the NRS to determine whether to service requests from a particular mobile station 100. For example, the service agent 154 may be configured to only process requests from a mobile station 100 if the mobile station 100 is listed in the NRS. Using an NRS and assigning specific mobile stations to a service agent 154 can allow the cellular network to include more than one service agent 154.

While FIG. 2 shows the service agent 154 connecting to one database 158, the service agent 154 may connect to more than one database. For example, the service agent 154 may connect to a profile server, a presence server and a name resolution server, or it may connect to a combination of these or other servers. Additionally, each database may include one or more sub-databases. For example, one server may host both the profile database and the presence database.

The service agent 154 may also interface with an Authentication, Authorization and Accounting ("AAA") server 156, which can additionally provide profile information to the service agent 154. The AAA server 156 can perform authentication, authorization and accounting functions. It can maintain information such as user profiles and quality-of-service information. The AAA server 156 can interact with the PDSN 106 to gather accounting information and to authenticate the mobile station 100. The service agent 154 can have a Remote Access Dial In User Services ("RADIUS") interface to the AAA server 156, or it can access the AAA server 156 directly. Alternatively, a RADIUS application server (not shown) may be separate from the AAA server 156. The service agent 154 may connect to the RADIUS application server, to the AAA server 156 or to both. The service agent 154 may also connect with other servers or databases storing accounting, billing or other profile information.

For example, the cellular network may include a billing aggregator. The billing aggregator may poll different systems for usage information about different mobile stations. The billing aggregator may receive usage detail records ("UDRs"), which can include information such as the amount of time used by a mobile station, the amount of data sent or received by a mobile station or other information. The billing aggregator may also receive transaction detail records ("TDRs"), which can include information such as the number of sessions or transactions engaged by a mobile station. The billing aggregator can then provide the usage information to the AAA server 156, where it can be accessed by the service agent 154. Then, the service agent 154 may use the usage information stored in the AAA server 156, for example, to detect billing mode changes for a mobile station.

The service agent 154 may also directly manage the interaction between the mobile station 100 and application servers, and the service agent 154 may directly poll the application servers or other devices for information. For example, the service agent 154 may request UDRs or TDRs from one or more application servers. Then, the service agent 154 may use the UDRs or TDRs. Additionally, the service agent 154 may provide the UDRs or TDRs to the AAA server 156. This may be done directly or it may be done using the RADIUS interface for processing. Then, the AAA server 154 can use the information for billing or other uses.

RADIUS is described in more detail in Internet Engineering Task Force Request For Comment 2865, "Remote Authentication Dial In User Service (RADIUS)," Rigney et al., June 2000, which is incorporated herein by reference in its entirety. RADIUS is also described in more detail in Internet Engineering Task Force Request For Comment 2866, "RADIUS Accounting," Rigney et al., June 2000, which is incorporated herein by reference in its entirety.

The service agent 154 can further connect to one or more application servers located on the service agent's network, although they may also be located on another network. The servers can provide various functionalities to the mobile station 100 or to another device, and the service agent 154 can serve as an intermediary between the mobile station 100 and the other device. For example, the service agent 154 can connect to an Instant Messaging server 160. As another example, the service agent 154 can connect to a Push to Talk server 162. The service agent 154 can connect to a greater or fewer number of servers, and the servers may provide additional services.

The service agent 154 can also connect to a gateway 164. A gateway is a network device generally used to link two different networks together. The gateway 164 can provide connectivity to the Internet 110, an intranet or to another network. The service agent 154 can also connect to a router or other network element that can provide additional connectivity.

SIP is an application-layer control protocol for creating, modifying and terminating sessions with one or more participants. Sessions can include, but are not limited to, Internet multimedia conferences, Internet telephone calls, multimedia distribution, TCP/IP sessions or instant messaging sessions. Participants in a session can communicate via multicast, a mesh of unicast relations, or a combination of both.

SIP messages, such as a SIP INVITE message, can be used to set-up a communication session. SIP is designed to be independent of the lower-layer transport protocol, and it is not tied to a specific communication protocol. A SIP message can include session descriptions that allow participants to negotiate a set of compatible media types and other protocols to be used during the communication session.

For example, a SIP INVITE message, which can be used to establish a session between two devices, can optionally include within the body of the message a Session Description Protocol ("SDP") structure. The SDP structure can describe the presentation capabilities or other characteristics of the mobile station 100. The SDP structure may describe, for instance, what audio/video capabilities are available, the make and model of the mobile station 100, available applications or other properties. The information carried in the SDP can be used in establishing the session between the two devices.

SIP also supports device mobility. A SIP device can register its current location with a SIP proxy server. Then, the SIP proxy server can redirect a message intended for the SIP device to its current location.

SIP is described in more detail in Internet Engineering Task Force Request for Comment 2543, "SIP: Session Initiation Protocol," Handley et al., March 1999, which is incorporated herein by reference in its entirety. SDP is described in more detail in Internet Engineering Task Force Request For Comment 2327, "SDP: Session Description Protocol," Handley et al., April 1998, which is incorporated herein by reference in its entirety.

Figure 3:
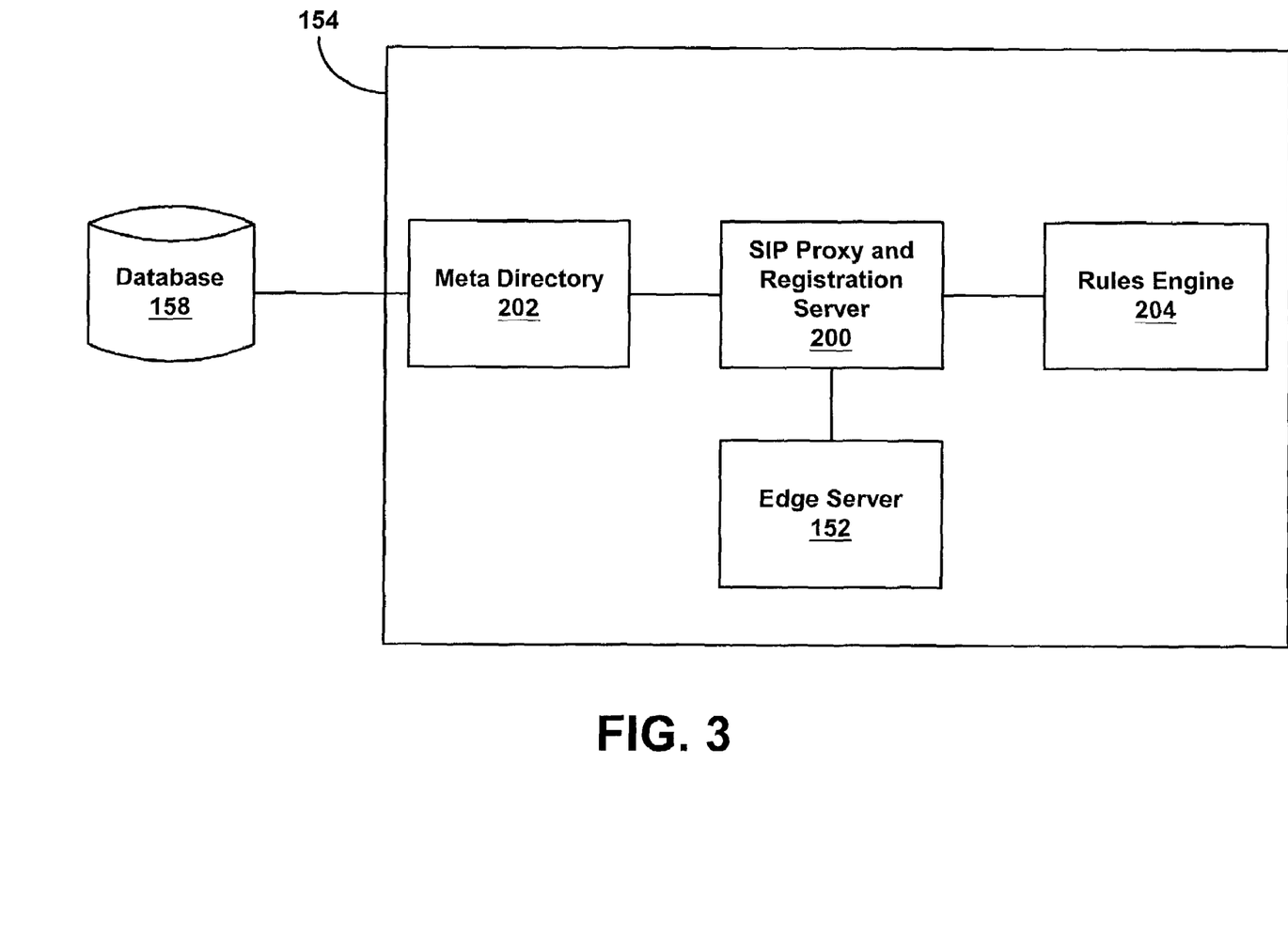
FIG. 3 shows one exemplary implementation of a service agent that supports the Session Initiation Protocol.

FIG. 3 shows one exemplary implementation of a service agent 154 that may be used in a communications system supporting the Session Initiation Protocol ("SIP"). The service agent 154 includes an edge proxy 152, a SIP proxy and registration server ("SIP server") 200, a meta directory 202 and a rules engine 204. Although depicted as four separate components in FIG. 3, the functionality of these four components can be combined into a smaller number of components or distributed among a greater number of components. The service agent 154 does not have to include all of these components, and it may include additional components.

The edge proxy 152 is generally the primary entry point into the service agent 154 for the mobile station 100. The edge proxy 152 may perform compression and decompression of SIP messages sent to and received from the mobile station 100, and it may perform load balancing of SIP requests from the mobile station 100 across a plurality of service agents. Additionally, the edge proxy 152 may perform encryption and decryption of SIP message headers, for example, to prevent revealing the network's internal topology.

The edge proxy 152 can have two IP interfaces. One interface can face the home agent 150 and be used for communicating with the mobile station 100. When receiving SIP messages from the mobile station 100, the edge proxy 152 can listen to the UDPcomp port defined to handle the compression of SIP messages. Upon receiving a SIP message on this port, the edge proxy 152 can decompress the message and proxy it to the service agent 154. The second interface can be used to receive messages destined for the mobile station 100. When receiving a message from the service agent 154 that is destined for a mobile station 100, the edge proxy 152 can compress the message and proxy it to the UDPcomp port at the mobile station 100.

The edge proxy 152 can also be configured to perform via header and record-route obfuscation. Via header and record-route obfuscation can hide the network's internal addresses and topology from the mobile station 100, thereby decreasing the opportunities for denial-of-service and other attacks. The edge proxy 152 may also track usage and transactions of mobile stations. For example, the edge proxy 152 may track the number of sessions engaged by a mobile station or the amount of information sent by a mobile station. The edge proxy 152 may provide this information to the service agent 154. This information may be provided, for example, as a UDR or a TDR. The edge proxy 152 may also provide this information to the AAA server 156 or to another device, where it could ultimately be accessed by the service agent 154. The information may also be used for billing or other functions within the cellular network.

The SIP server 200 can function as a SIP proxy server. A SIP device, such as the mobile station 100, may register its current location with the SIP server 200. This may allow the SIP server to redirect messages for the SIP device to the SIP device's current location. Alternatively, or additionally, the edge proxy 152 can function as a SIP proxy server.

The meta directory 202 can provide an interface between the service agent 154 and the database 158. The service agent 154 may need to retrieve profile information from multiple sources in order to provide authentication, authorization, policy management or other functions. And, as previously described, this information may be stored in one or more databases 158 connected to the service agent 154. In order to reduce or prevent multiple serial or daisy-chained database accesses, which can adversely affect the performance of the system, the meta directory 202 can coordinate accesses to the database 158.

For example, the meta directory 202 may receive multiple requests from the service agent 154 to search the database 158 pertaining to one SIP session. The meta directory 202 may then format the multiple requests into a more efficient search request, and it may send the request to one or more of the databases 158 for processing. In another example, the service agent 154 may simultaneously process SIP requests relating to more than one SIP session. For example, the service agent 154 may process SIP requests for different mobile stations, or it may process request for more than one session for the same mobile station 100. The meta directory 202 can operate as a type of buffer to store the searches for the multiple requests. Then, the meta directory 202 can perform one search to service the several requests, thereby decreasing the processing overhead required to access the database 158.

In a preferred embodiment, the connection between the meta directory 202 and the database 158 supports the Lightweight Directory Access Protocol ("LDAP"), Structured Query Language ("SQL") or another generic connection. A generic connection may be configured to understand an application program interface ("API") or to understand a non-standard legacy system access method. Additionally, a generic connection may support the text-based interchange of content, such as by using eXtensible Markup Language ("XML"), Simple Object Access Protocol ("SOAP") or another such protocol.

The rules engine 204 can store configurable rules that may be used in conjunction with the mobile station profile information retrieved by the service agent 154. The service agent 154 may use the rule configurations, mobile station's preferences, mobile station empirical data and other information to process requests. The rules engine 204 can allow the service agent 154 to provide policy management on an application-specific basis. The rules engine can be used to provide an efficient way to implement "global" rules changes without having to specifically update the profile information for multiple mobile stations.

In order to support SIP, the mobile station 100 may run a SIP client. The SIP client can be a software application running on the mobile station 100, or it may be a part of an application program or other program. The SIP client can be used to process SIP messages. For example, the SIP client may support encryption and decryption of SIP message headers. It may also provide additional information to the service agent 154 that can be used in processing SIP messages sent to or from the mobile station 100. For example, the SIP client may support authentication by sending a username and password to the service agent 154. Additionally, the SIP client may be configured to send certain SIP messages, such as SIP INVITE messages, through the service agent 154.

2. Exemplary Operation

The service agent 154 can receive SIP messages, such as a SIP INVITE message. A SIP message may be sent from the mobile station 100 to another device, or it may be sent from another device to the mobile station 100. Using profile information, the service agent 154 can process the SIP message to provide real-time tiered rating of communication services.

Figure 4:
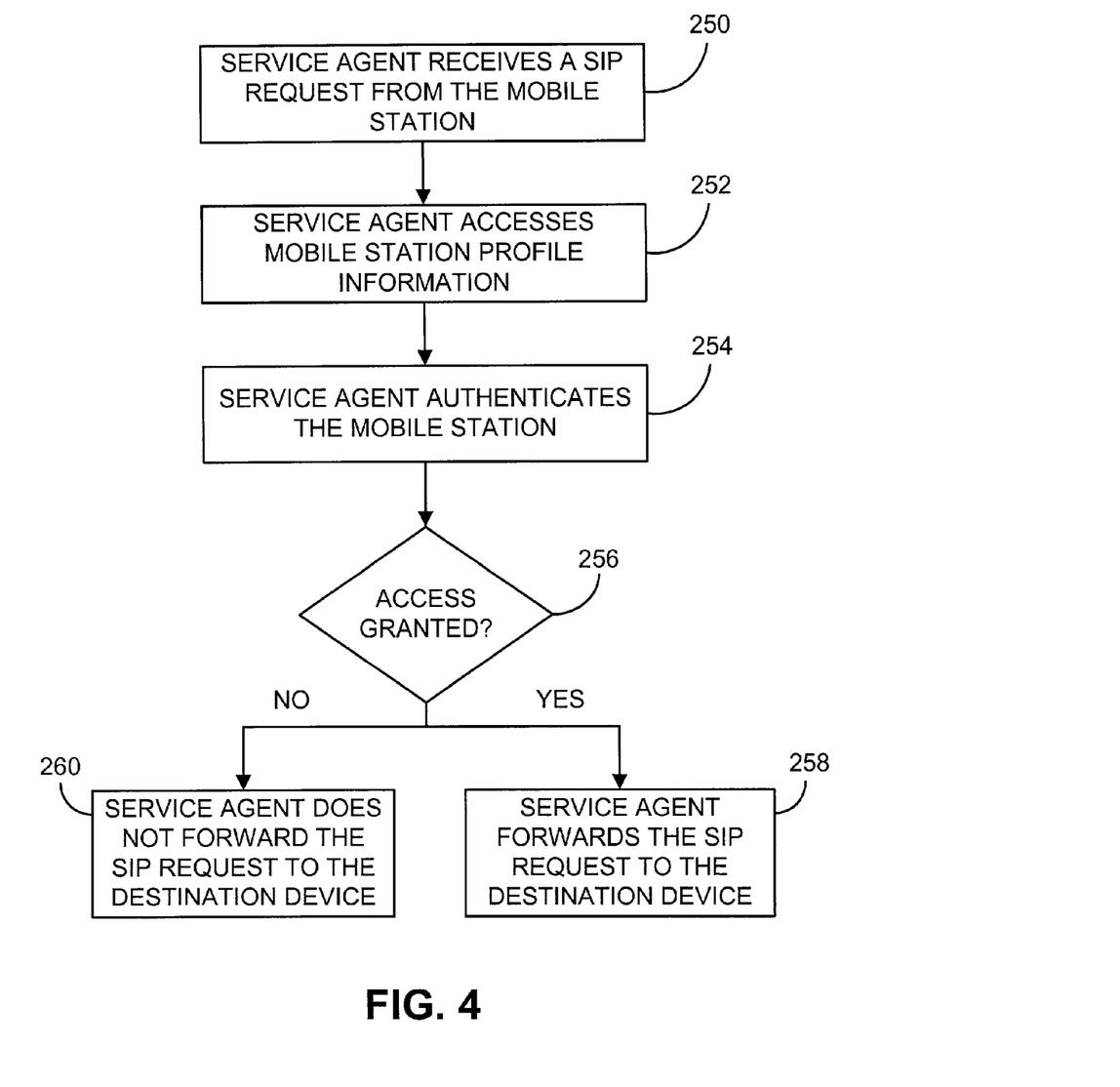
FIG. 4 shows an exemplary process for the service agent of FIG. 3 processing a Session Initiation Protocol request received from a mobile station.

FIG. 4 shows an exemplary process for the service agent 154 processing a SIP request received from a mobile station 100. At Step 250, the service agent 154 receives the SIP request from a mobile station 100. The request can be an invitation to another device to establish a communication session. For example, the request may be a SIP INVITE message from the mobile station 100 to a destination device. After receiving the SIP request from the mobile station 100, the service agent 154 accesses the mobile station's profile information from the database 158, shown at Step 252. As previously described, the profile information can include information about the mobile station 100, the user of the mobile station, billing information, accounting information or other information. The service agent 154 may also access the AAA server 156, the RADIUS server, or another database to obtain additional profile information. And, the service agent 154 may access the rules engine 204 to obtain additional pricing, billing, usage or other information.

Then, at Step 254, the service agent 154 authenticates the mobile station 100 using the mobile station's profile information. For instance, the service agent 154 may determine if the mobile station 100 is authorized to access the network, and if the mobile station 100 is authorized to perform the requested service. For example, the mobile station 100 may have sent a SIP INVITE message to begin an instant messaging session. The service agent 154 may determine if the mobile station 100 is authorized to access the network and if the mobile station 100 is authorized to engage in an instant messaging session. Then, the service agent 154 determines if the mobile station is authorized to receive access to the requested service, shown at Step 256. If the mobile station 100 is authorized to perform the requested service, the service agent 154 may forward the SIP request to the destination device, shown at Step 258. For example, the service agent 154 may forward the SIP INVITE request to the IM server 160. Then, the mobile station 100 can proceed to establish a connection with the IM server 160. Subsequent messages between the mobile station 100 and the IM server 160 may be routed through the service agent 154, or they may bypass the service agent 154.

If the mobile station 100 is not authorized, the service agent 154 can provide an appropriate denial, shown at Step 260. For example, the mobile station 100 may not be authorized to access the network. As another example, the mobile station 100 may be authorized to access the network but not to access the requested service, such as to participate in an IM session. The denial may include sending a notification to the mobile station 100 that the request will not be forwarded to the destination device.

Figure 5:
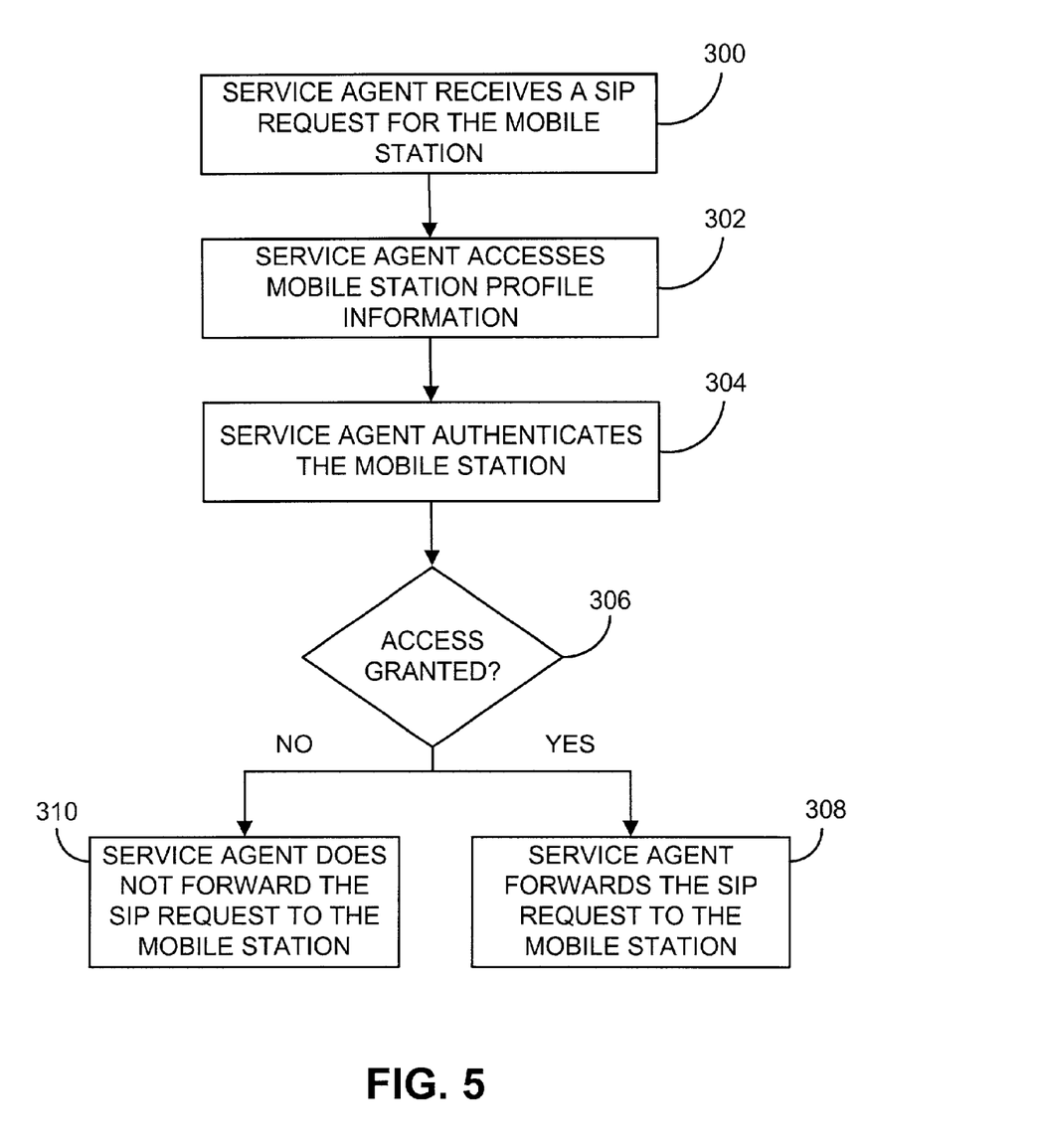
FIG. 5 shows an exemplary process for the service agent of FIG. 3 processing a Session Initiation Protocol request sent to a mobile station.

In addition to processing SIP messages received from the mobile station 100, the service agent 154 can also process SIP messages sent to the mobile station 100 from other devices. FIG. 5 shows an exemplary process for the service agent 154 processing a SIP request sent to the mobile station 100 from another device. At Step 300, the service agent 154 receives the SIP request intended for the mobile station 100. For instance, another device may send the mobile station 100 a SIP INVITE request to establish a new connection. Then, at Step 302, the service agent 154 accesses profile information for the mobile station 100. For instance, the service agent 154 may access the database 158, the AAA server 156, the rules engine 204 or another information store. Using the profile information, the service agent 154 can authenticate the mobile station 100 and determine whether the mobile station 100 is authorized to engage in the session requested by the SIP request, as shown at Step 304. For example, the SIP request may be a request from the instant messaging server 160 to start an instant messaging session, and using the profile information the service agent 154 may determine that the mobile station 100 is authorized to access the network and to engage in an instant messaging session. Next, the service agent 154 determines if the mobile station 100 will be granted access to the service, shown at Step 306. If the mobile station 100 is allowed to access the requested service, then the service agent 154 can forward the SIP request to the mobile station 100, shown at Step 308. After receiving the request, the mobile station 100 can proceed to process the request and establish a session with the IM server 160. However, if the mobile station 100 is not allowed to access the requested service, then the service agent 154 may prevent establishment of the session, for example, by not forwarding the request to the mobile station 100, shown at Step 310.

By monitoring communication requests and approving the requests based on mobile station profile information, the service agent 154 can be used to implement various functions in the cellular network. For example, the service agent 154 can be used to provide real-time tiered rating of communications services. To facilitate this, the service agent 154 can detect an actual or proposed communication to or from a mobile station 100. The service agent 154 generally has access to profile information, which can indicate at least a first and a second billing mode for the mobile station 100. When the service agent 154 detects a communication involving the mobile station 100, the service agent 154 may then refer to the profile information to determine the mobile station's current billing mode and to detect a transition from the first billing mode to the second billing mode.

In response, the service agent 154 may request an approval from the mobile station 100 for the transition. If the service agent 154 receives an approval, then the service agent 154 can allow the communication to proceed and the billing mode transition to occur. Alternatively, if the mobile station 100 does not sent an approval, then the service agent 154 may prevent the communication from proceeding.

The billing modes might be, for example, respective billing rates to be applied in particular scenarios. For instance, the first billing mode might be a first billing rate to be applied in a first scenario, and the second billing mode might be a second billing rate to be applied in a second scenario. The transition from the first billing mode to the second billing mode might then be a transition from the first scenario to the second scenario. When that transition occurs, the service agent 154 can switch from charging for the mobile station's usage at the first billing rate to charging for the mobile station's usage at the second billing rate.

The billing mode rates can be set using various different criteria. For example, a cellular provider may wish to limit use on its cellular network. Therefore, it may charge a higher billing mode rate for communications sessions over a set threshold, such as a number of airtime minutes or a number of communication sessions. Alternatively, the cellular provider may want to charge less for mobile stations that access its network frequently, thereby encouraging the use of its cellular network. In this case, the cellular provider may set a lower billing mode rate for communications sessions over the set threshold. Of course, these are just examples, and other criteria may be used to set the billing mode rates. Additionally, the billing mode rates may differ for different mobile stations, and different thresholds may be used for different mobile stations.

As a more specific example of billing modes, the profile information might indicate that the first scenario occurs when the mobile station 100 uses up to a threshold number of communication units, and the second scenario occurs when the mobile station 100 uses more than the threshold number of communication units. A communication unit may be a measure such as a number of communication minutes, a number of airtime minutes, a number of files transferred, a number of instant messaging sessions, a number of communications sessions, an amount of data exchanged or another measure. The profile information preferably indicates the mobile station's current communication usage measured in communication units.

When the service agent 154 receives or detects a communication involving the mobile station 100, the service agent 154 may refer to the profile information and identify the applicable billing modes. For example, the service agent 154 may determine that the mobile station 100 is to be billed based on the number of communication units used by the mobile station 100. If the mobile station 100 has not used up to the threshold number of communication units, the mobile station 100 would then be charged at the first billing rate; however, if the mobile station 100 has used more than the threshold number of communication units, it would be billed at the second billing rate. The service agent 154 may determine the billing mode when it initially detects the communication involving the mobile station 100, such as by receiving a request from the mobile station 100 to establish a session with another device. Additionally, the service agent 154 may track the mobile station's usage during the communication (e.g., by measuring minutes of communication of a current session) in order to detect a transition between billing modes during the communication.

When the mobile station 100 has exhausted (or is about to exhaust) the threshold number of units or other measure, the service agent 154 may detect a transition from the first billing rate to the second billing rate. In response, the service agent 154 may pause the communication between the mobile station 100 and the other device, and the service agent 154 may send to the mobile station 100 a transition-approval message. The transition-approval message may inform the mobile station 100 of the pending transition to the second billing rate and may ask for an approval of that transition, as could be entered by a mobile station user. If the service agent 154 receives the approval, then the service agent 154 can allow the communication between the devices to continue at the second billing rate. However, if the service agent 154 does not receive an approval, then the service agent 154 may terminate the communication or otherwise restrict the communication between the two devices.

In one exemplary embodiment, the service agent 154 provides real-time tiered rating of communication services in a SIP environment. A mobile station 100 can initiate a communication session using SIP. The mobile station 100 might have a respective SIP address that is associated with the mobile station 100, and the mobile station 100 may also run a SIP client application. The mobile station 100 initiates a communication session with a destination device, such as the IM server 160 or the PTT server 162, by using the SIP client application to send a SIP INVITE request to the destination device. The SIP INVITE request ordinarily carries an indication of the originating address and an indication of the destination address. Once the destination device receives the SIP INVITE request, the destination device may then respond with a SIP 200 OK message and establish a communication session.

The SIP INVITE request, however, does not necessarily travel directly from the mobile station 100 to the destination device. The SIP INVITE request can pass through service agent 154, which can be programmed with a SIP proxy application that functions to forward the SIP INVITE request to the destination device. Before forwarding the SIP INVITE request to the destination device, the service agent 154 can determine the proper billing mode and detect a transition from a first billing mode to a second billing mode, and forwarding the SIP INVITE request to the destination device may be conditional on approval of the billing mode transition from the first billing mode to the second billing mode.

Once the service agent 154 receives the SIP INVITE request from the mobile station 100, the service agent 154 can access the database 158 to determine profile information for the mobile station 100. The service agent 154 might also access the AAA server 156, the rules engine 204 or another source to obtain profile information for the mobile station 100. For example, the service agent 154 may retrieve a billing plan and a current usage for the mobile station 100.

Based on the retrieved information, the service agent 154 may determine that the mobile station 100 should billed based on its use of communication units, which in this example corresponds to a number of communication sessions. The profile information may further indicate that the mobile station 100 should be billed at $X per communication session for the mobile station's 100 first ten communication sessions and that after ten communication sessions the mobile station 100 should be billed at $Y per communication session.

Using the retrieved profile information, the service agent 154 can determine whether the session is the last of the first ten, or the service agent 154 may determine whether the session is the eleventh. If the service agent 154 detects a transition, it may then pause the signaling communication between the mobile station 100 and the destination device. This can allow the service agent 154 to request approval from the mobile station 100 for approval of the billing mode transition before passing a SIP signaling message to the destination device or otherwise allowing the communication to continue. If the service agent 154 determines the session is the eleventh, then a billing transition occurs, and the service agent 154 may receive approval from the mobile station 100 to transfer between billing modes. The service agent 154 may send a request to the mobile station 100 to approve the transition.

The transition-approval message sent to the mobile station 100 can take various forms. For example, it could be an HTTP-based message (e.g., an HTTP PUSH). As another example, it could be a generic SIP message. Other examples are also possible. If the transition-approval message is an HTTP-based message, it could carry HTML code defining a web page (or card) that can be displayed on the mobile station 100 and viewed by a mobile station user. The page may inform the mobile station 100 user that the mobile station 100 has used up the ten allotted communication sessions at the rate of $X per session and that the charge for each additional session will be $Y. The page can then provide an input mechanism that the mobile station user can use to indicate whether or not to accept the transition. When the mobile station user makes a choice by employing the input mechanism, the mobile station 100 can send a predetermined signal representative of the mobile station user's decision to the service agent 154.

If the service agent 154 receives an acceptance of the transition to the billing rate of $Y per session, then the service agent 154 may then allow the communication session to proceed. In particular, the service agent 154 may pass along the SIP signaling message that it received, for example by sending it to the destination device. Alternatively, if the service agent 154 does not receive an acceptance of the transition to the billing rate of $Y per session, then the service agent 154 may prohibit further communication between the mobile station 100 and the destination device. In particular, the service agent 154 may prevent the SIP signaling message from being sent to the destination device, and the service agent 154 may send a SIP DENY or other message back to the mobile station 100 indicating that the session will not be established.

Many variations are also possible For example, the service agent 154 can perform similar processing for SIP INVITE messages, or other requests, sent from a destination device to the mobile station 100. The service agent 154 can access the mobile station's profile information in order to detect a billing mode transfer. The service agent 154 can request from the mobile station user and receive an approval to transfer billing modes. However, if an approval is not received, the service agent 154 can prevent the destination device from establishing a session with the mobile station 100.

Alternative embodiments may also use a different measure of a communication unit. Other alternative embodiments may use more than two billing modes, and they may use more than one communication unit. For example, a first billing mode and a second billing mode may correspond to a first communication unit. The first communication unit may be, for example, a number of instant messaging sessions (e.g., one instant messaging session). A third billing mode and a fourth billing mode may correspond to a second communication unit. The second communication unit may be, for example, a number of airtime minutes used (e.g. one airtime minute). When the mobile station 100 attempts to engage in an instant messaging session, the service agent 154 uses the first and second billing modes to determine how the mobile station 100 should be billed for the instant messaging session. Simultaneously, the service agent 154 may also use the third and fourth billing modes to determine how the mobile station 100 should be billed for its airtime usage during the instant messaging session.

In another alternative embodiment, the approval for changes in billing modes may be determined before the transfer event occurs. For example, a user may agree to an authorization to go between a first billing mode and a second billing mode, and the authorization may be programmed into the AAA server 156, the database 158 or the rules engine 204. Then, when a transition occurs, the service agent 154 does not have to prompt the mobile station 100 for an authorization to transfer between the billing modes, because the transfer was already authorized. However, when the transition occurs, the service agent 154 may still provide the mobile station 100 with a notification that a transfer between billing modes has occurred. This may be done, for example, by sending the mobile station 100 an HTTP, generic SIP or other message indicating the transfer.

As one specific example of the service agent 154 prompting the mobile station 100 for an authorization to transfer between billing modes before receiving a request that triggers a transfer, a billing mode transition may occur between a tenth and eleventh instant messaging session (i.e., the tenth instant messaging session is billed at $X and the eleventh instant messaging session is billed at $Y). After establishing the tenth instant messaging session, but before receiving a request to establish the eleventh instant messaging session, the service agent 154 may send the mobile station 100 a request for an approval to transfer to a different billing mode. The mobile station 100 can respond to the request, for instance by approving the request, and then the service agent 154 can record the approval in the database 158 or in another location. Then, when the service agent 154 receives a request to establish an eleventh instant messaging session, it can check the database 158 for the approval previously received from the mobile station 100. After retrieving the authorization stored in the database 158, the service agent 154 can then allow the eleventh instant messaging session. Requesting a billing mode transition approval in this manner can speed the processing of a request that initiates a billing mode transition, because the service agent 154 will not have to stop and wait for an approval from the mobile station 100. The approval can be obtained at an earlier time from the mobile station 100, which may be more convenient to the mobile station user.

In yet another alternate embodiment, the service agent 154 can be configured to accept and process HTTP messages. The service agent 154 may process HTTP message in addition to SIP messages, or it may process HTTP messages in lieu of SIP messages. The mobile station 100 may initiate a communicate session with a destination device by sending HTTP message instead of by sending a SIP request. The service agent 154 can receive the HTTP request to initiate the communication session. In turn, the service agent 154 can access the database 158, the AAA server 156 or the rules engine 204 to obtain profile information. The service agent 154 can determine if the mobile station 100 is authorized to proceed with the communication session. If the mobile station 100 is authorized to proceed with the communication session, then the service agent 154 may pass the HTTP message on to the destination device. As previously discussed, the service agent 154 could also be used to process an HTTP request sent from the destination device to the mobile station 100. HTTP, and in particular HTTP 1.1, is described in more detail in the Internet Engineering Task Force Request For Comment 2616, "Hypertext Transfer Protocol—HTTP/1.1", Fielding et al., June 1999, which is incorporated herein by reference in its entirety.

In another alternate embodiment, the mobile station may send or receive requests to establish sessions using protocols other than SIP or HTTP. The service agent 154 may be configured to services these requests. And, the service agent 154 may be capable of servicing requests using multiple different protocols.

In yet another alternate embodiment, the service agent 154 can be used to monitor tolls for cellular (e.g., PCS) phone service. For example, a cellular service plan may charge a user of a mobile station 100 a first rate for up to a threshold number of airtime minutes and a second rate for additional airtime minutes. The service agent 154 may be involved in setting up, carrying and/or tearing down cellular phone calls, and it can keep track of how many airtime minutes the mobile station 100 has used. By reference to the profile information, the service agent 154 can detect a transition from the first airtime rate to the second airtime rate. Then, the service agent 154 can request an approval from the transfer from the mobile station 100.

Alternatively, a network entity other than the service agent 154 can monitor the setting up, carrying and/or tearing down of cellular phone calls. Preferably, the network entity sits within the call signaling path. Examples of other network entities include a service control point ("SCP"), a service node, and an intelligent peripheral. Other examples are also possible, and these may also be used. When the network entity detects the transition, the network entity can send a transition-approval message to the mobile station 100. The transition approval message can take various forms, depending, for instance, on the capabilities of the mobile station 100. For instance, it could be an short message service ("SMS") message and/or a web page (passed as a NetAlert-type SMS message). As previously described, the mobile station user can then decide whether or not to approve the transition. If the mobile station user approves of the transition, the network entity may then allow the communication; however, if the mobile station user does not approve the transition, then the network entity may prevent further communication of call.

In yet another embodiment, the functionality of the service agent 154 may be included in one or more different elements. For example, the service agent 154 may reside on the mobile station 100 and run as part of the SIP client or as part of another application program. Alternatively, the service agent 154 may run at a server, such as the IM server 160 or the PTT server 162. The service agent's 154 functionality may also be included in or more devices connected to the cellular network, such as a SIP proxy server, an HTTP server, a SCP, a session manager, the AAA server 156, or other device.

An exemplary embodiment of the present invention has been described above. Those skilled in the art will understand, however, that changes and modifications may be made to this embodiment without departing from the true scope and spirit of the present invention, which is defined by the claims.

We claim:

1. A method for managing billing modes, the method comprising:
    defining a first billing mode for a communicative entity for use of up to a threshold number of communication units;
    defining a second billing mode for the communicative entity for use of more than the threshold number of communication units;
    receiving a signaling message indicative of a communication session involving the communicative entity;
    detecting a transfer from the first billing mode to the second billing mode by comparing a number of communication units used so far by the communicative entity to the threshold number; and
    responsively sending a request message to the communicative entity requesting approval of the transfer.

2. The method of claim 1, wherein the signaling message is a Session Initiation Protocol (SIP) INVITE message.

3. The method of claim 1, wherein receiving a signaling message indicative of a communication session involving the communicative entity comprises:
    receiving a SIP INVITE message from the communicative entity requesting initiation of the communication session.

4. The method of claim 1, further comprising:
referring to a profile store to determine the threshold number and the number of communication units used so far by the communicative entity.

5. The method of claim 4, wherein referring to a profile store to determine the threshold number and the number of communication units used so far by the communicative entity comprises:
accessing an accounting server.

6. The method of claim 5, wherein the accounting server stores profile information keyed to communicative entities.

7. The method of claim 5, wherein the accounting server is a RADIUS accounting server.

8. The method of claim 5, wherein the accounting server is an Authentication, Authorization and Accounting (AAA) server.

9. The method of claim 1, further comprising:
transferring from the first billing mode to the second billing mode; and
recording a usage for the communication session.

10. The method of claim 9, wherein recording a usage for the communication session comprises:
generating a usage detail record for the communication session, wherein the usage detail record indicates a type of communication session, and wherein the usage detail record indicates a duration of the communication session.

11. The method of claim 1, wherein responsively sending a request message to the communicative entity requesting approval of the transfer comprises:
sending the communicative entity a web page that includes an input mechanism, wherein the input mechanism can be used to authorize the transfer from the first billing mode to the second billing mode.

12. The method of claim 1, further comprising:
receiving from the communicative entity an authorization to transfer from the first billing mode to the second billing mode; and
transferring from the first billing mode to the second billing mode.

13. A method for managing billing rates, the method comprising:
receiving a request to establish a session involving a communicative entity;
determining a number of communication units used so far by the communicative entity;
detecting, based at least in part on the number of communication units used so far by the communicative entity, a transfer from a first billing rate for the communicative entity to a second billing rate for the communicative entity; and
requesting from the communicative entity an authorization for the transfer.

14. The method of claim 13, further comprising:
receiving from the communicative entity the authorization for the transfer; and
establishing the session.

15. The method of claim 14, further comprising:
recording the authorization in a profile store.

16. The method of claim 13, wherein determining a number of communication units used so far by the communicative entity comprises:
accessing a profile store, wherein the profile store defines the first billing rate for use of up to a threshold number of communication units and defines the second billing rate for use of more than the threshold number of communication units.

17. The method of claim 16, wherein detecting, based at least in part on the number of communication units used so far by the communicative entity, a transfer from a first billing rate for the communicative entity to a second billing rate for the communicative entity comprises:
determining that the number of communication units used so far by the communicating entity exceeds the threshold number.

18. The method of claim 16, wherein accessing a profile store comprises:
accessing an Authentication, Authorization and Accounting (AAA) server, wherein the AAA server stores profile information keyed to communicative entities.

19. The method of claim 16, wherein accessing a profile store comprises:
accessing a RADIUS accounting server, wherein the RADIUS accounting server stores profile information keyed to communicative entities.

20. A method for detecting real-time billing mode changes, the method comprising:
defining a first billing mode and a second billing mode for a communicative entity, wherein the first billing mode corresponds to a predetermined number of communication units and the second billing mode corresponds to communication units in excess of the predetermined number of communication units;
while the communicative entity is engaged in a communication session, determining a current usage of the communicative entity, wherein the current usage is measured in communication units;
detecting a transfer from the first billing mode to the second billing mode when the current usage exceeds the predetermined number of communication units;
in response to detecting the transfer, suspending the communication session and requesting an authorization from the communicative entity to transfer from the first billing mode to the second billing mode.

21. The method of claim 20, further comprising:
receiving from the communicative entity the authorization to transfer from the first billing mode to the second billing mode; and
resuming the communication session.

22. The method of claim 20, further comprising:
receiving from the communicative entity a disapproval to transfer from the first billing mode to the second billing mode; and
terminating the communication session.

23. A system for managing billing modes, the system comprising:
a profile store that stores profile information for a communicative entity, wherein the profile information defines a first billing mode for the communicative entity for use of up to a threshold number of communication units and a second billing mode for the communicative entity for use of more than the threshold number of communication units; and
a service agent, wherein the service agent detects a transfer from the first billing mode to the second billing mode based on the profile information and responsively requests from the communicative entity an approval of the transfer.

24. The system of claim 23, wherein the service agent detects the transfer when the service agent receives a request to establish a communication session involving the communicative entity.

25. The system of claim 23, wherein the service agent tracks the communicative entity's usage during a communication session and detects the transfer during the communication session.

26. The system of claim 23, wherein the profile store includes a RADIUS accounting server.

27. The system of claim 23, wherein the profile store includes an Authentication, Authorization and Accounting (AAA) server.

* * * * *